United States Patent
Abu Al-Rubb

(10) Patent No.: US 10,138,864 B2
(45) Date of Patent: Nov. 27, 2018

(54) WATER TURBINE WITH VARIABLE BUOYANCY

(71) Applicant: Khalil Abu Al-Rubb, Doha (QA)

(72) Inventor: Khalil Abu Al-Rubb, Doha (QA)

( * ) Notice: Subject to any disclaimer, the term of this patent is extended or adjusted under 35 U.S.C. 154(b) by 315 days.

(21) Appl. No.: 14/900,918

(22) PCT Filed: Jun. 27, 2014

(86) PCT No.: PCT/GB2014/051966
§ 371 (c)(1),
(2) Date: Dec. 22, 2015

(87) PCT Pub. No.: WO2014/207478
PCT Pub. Date: Dec. 31, 2014

(65) Prior Publication Data
US 2016/0160835 A1    Jun. 9, 2016

(30) Foreign Application Priority Data

Jun. 27, 2013    (GB) .................................. 1311461.6

(51) Int. Cl.
*F03B 3/14* (2006.01)
*F03B 13/10* (2006.01)
(Continued)

(52) U.S. Cl.
CPC .............. *F03B 13/10* (2013.01); *B63B 35/44* (2013.01); *B63B 39/00* (2013.01); *B63B 39/03* (2013.01);
(Continued)

(58) Field of Classification Search
CPC .. F03B 3/14; F03B 3/145; F03B 13/10; F03B 15/00; F03B 17/02
See application file for complete search history.

(56) References Cited

U.S. PATENT DOCUMENTS 6,018,947 A * 2/2000 DeMarco ................ F03B 17/02
60/496
7,656,051 B2 * 2/2010 Perin ..................... F03B 17/025
290/43
(Continued)

FOREIGN PATENT DOCUMENTS

DE    20 2006 009953 U1    9/2006
WO    WO 2008/098003 A1    8/2008

OTHER PUBLICATIONS

International Search Report corresponding to International Patent Application No. PCT/GB2014/051966, European Patent Office, dated Jan. 8, 2015; (5 pages).
(Continued)

*Primary Examiner* — Ninh H Nguyen
(74) *Attorney, Agent, or Firm* — Nixon Peabody LLP

(57) ABSTRACT

A floatable turbine (10) is described, which is movable on a substantially vertically oriented guide (20) so that the turbine (10) may move downwards along the guide (20) under gravitational force. The turbine equipment (10) is of negative buoyancy to facilitate it sinking, but is further provided with adjustable buoyancy means to allow the turbine arrangement to be imparted with a positive buoyancy when required. When imparted with a positive buoyancy the turbine equipment (10) floats back up the vertically oriented guide (20) under the buoyancy force. When moving down the guide (20) under gravity, and back up the guide (20) under buoyancy force an effective artificial current is generated by the movement through the turbine blades, turning the blades which in turn cause a generator to produce electricity, typically by suitable gearing.

18 Claims, 8 Drawing Sheets

(51) Int. Cl.
- *F03B 17/02* (2006.01)
- *F03B 13/00* (2006.01)
- *B63B 35/44* (2006.01)
- *B63B 39/00* (2006.01)
- *B63B 39/03* (2006.01)
- *F03B 15/06* (2006.01)

(52) U.S. Cl.
CPC .............. *F03B 13/00* (2013.01); *F03B 15/06* (2013.01); *F03B 17/02* (2013.01); *B63B 2035/4466* (2013.01)

(56) References Cited

U.S. PATENT DOCUMENTS

| | | | | |
|---|---|---|---|---|
| 8,974,184 | B2* | 3/2015 | Becker | F01D 7/00 |
| | | | | 416/136 |
| 2006/0168953 | A1* | 8/2006 | Carter | F03B 17/04 |
| | | | | 60/392 |
| 2010/0107627 | A1* | 5/2010 | Morgan | B63B 35/44 |
| | | | | 60/495 |

OTHER PUBLICATIONS

International Written Opinion corresponding to International Patent Application No. PCT/GB2014/051966, European Patent Office, dated Jan. 8, 2015; (9 pages).

International Preliminary Report on Patentability corresponding to International Patent Application No. PCT/GB2014/051966, European Patent Office, dated Dec. 29, 2015; (10 pages).

* cited by examiner

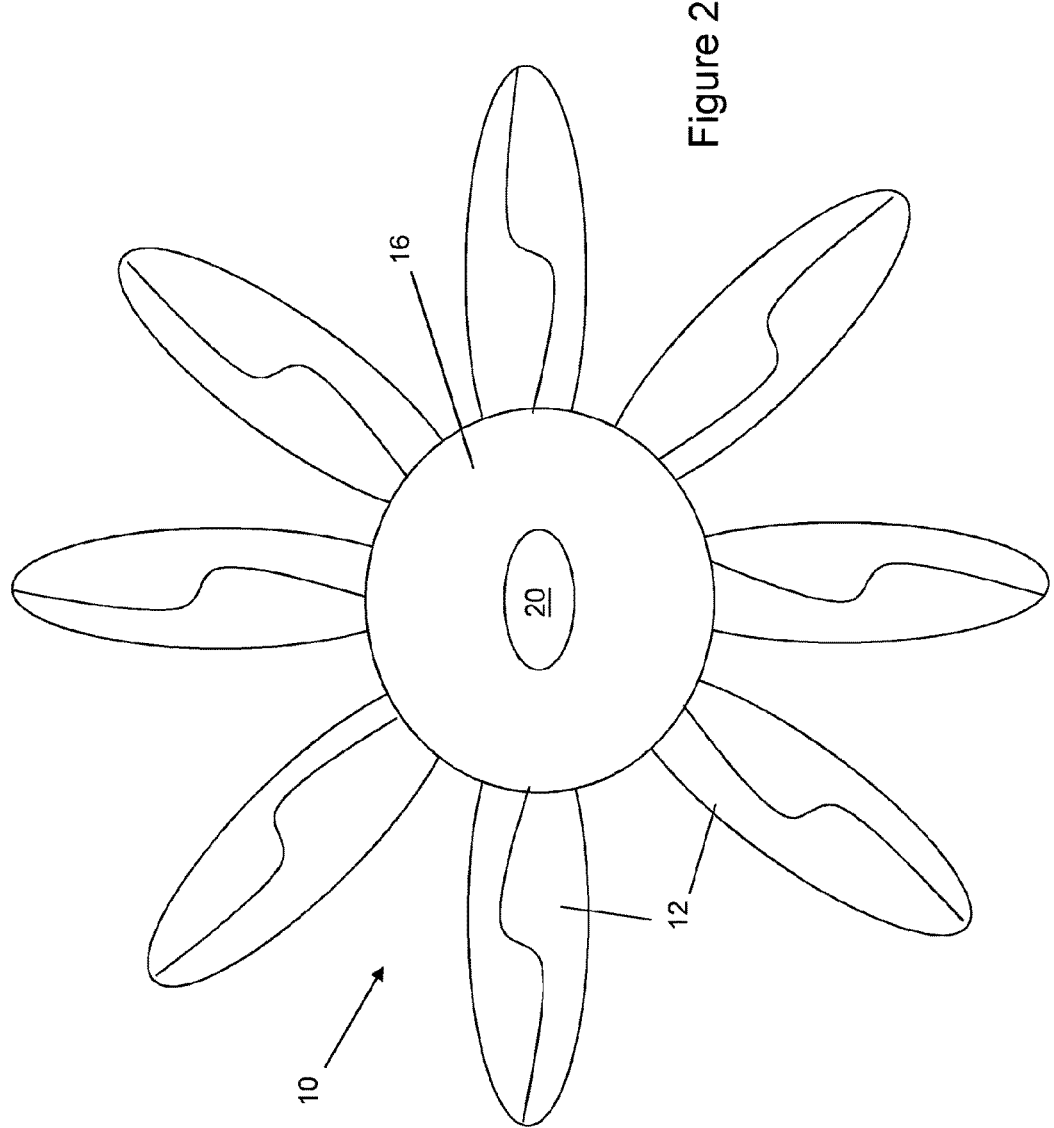

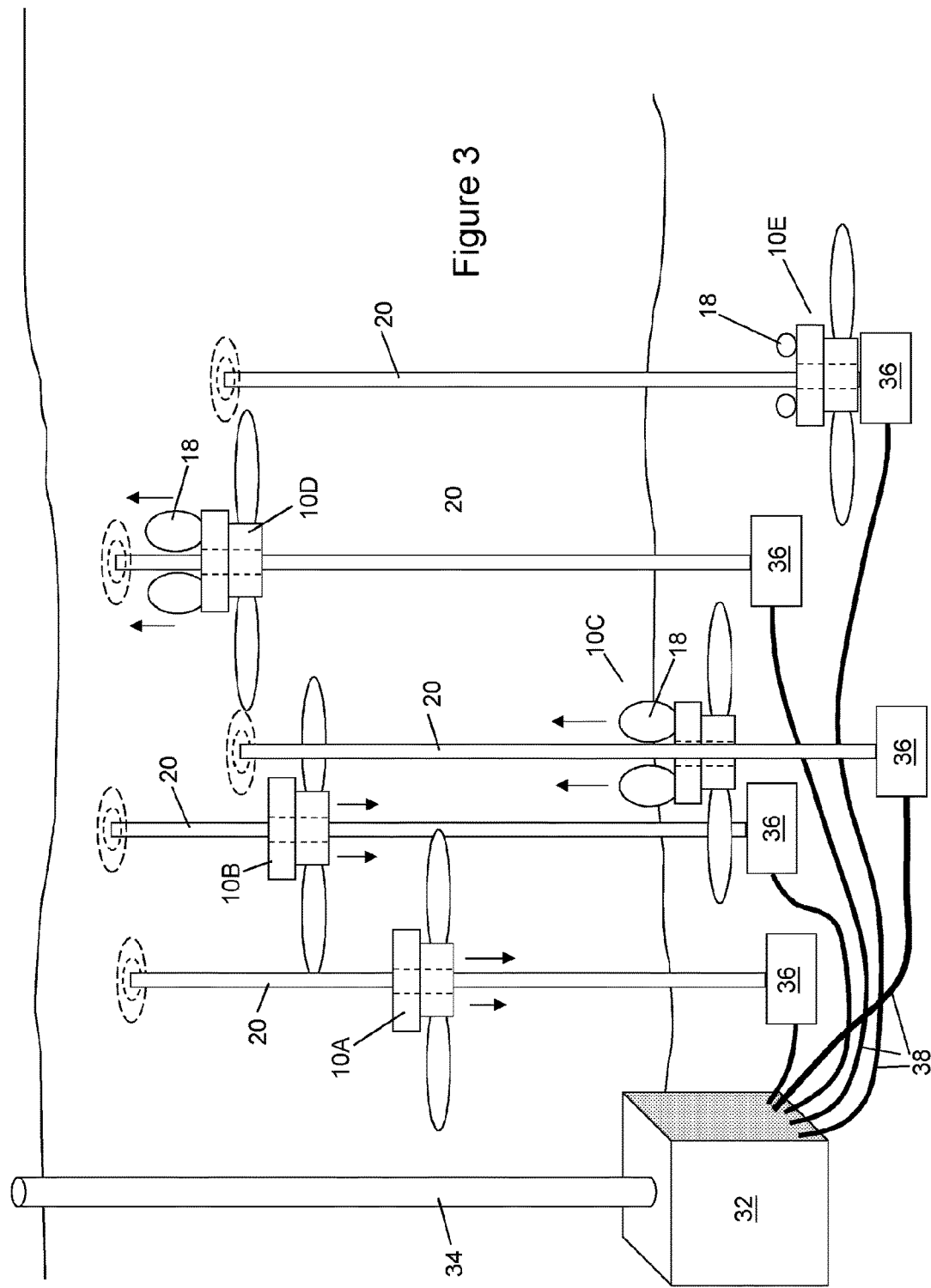

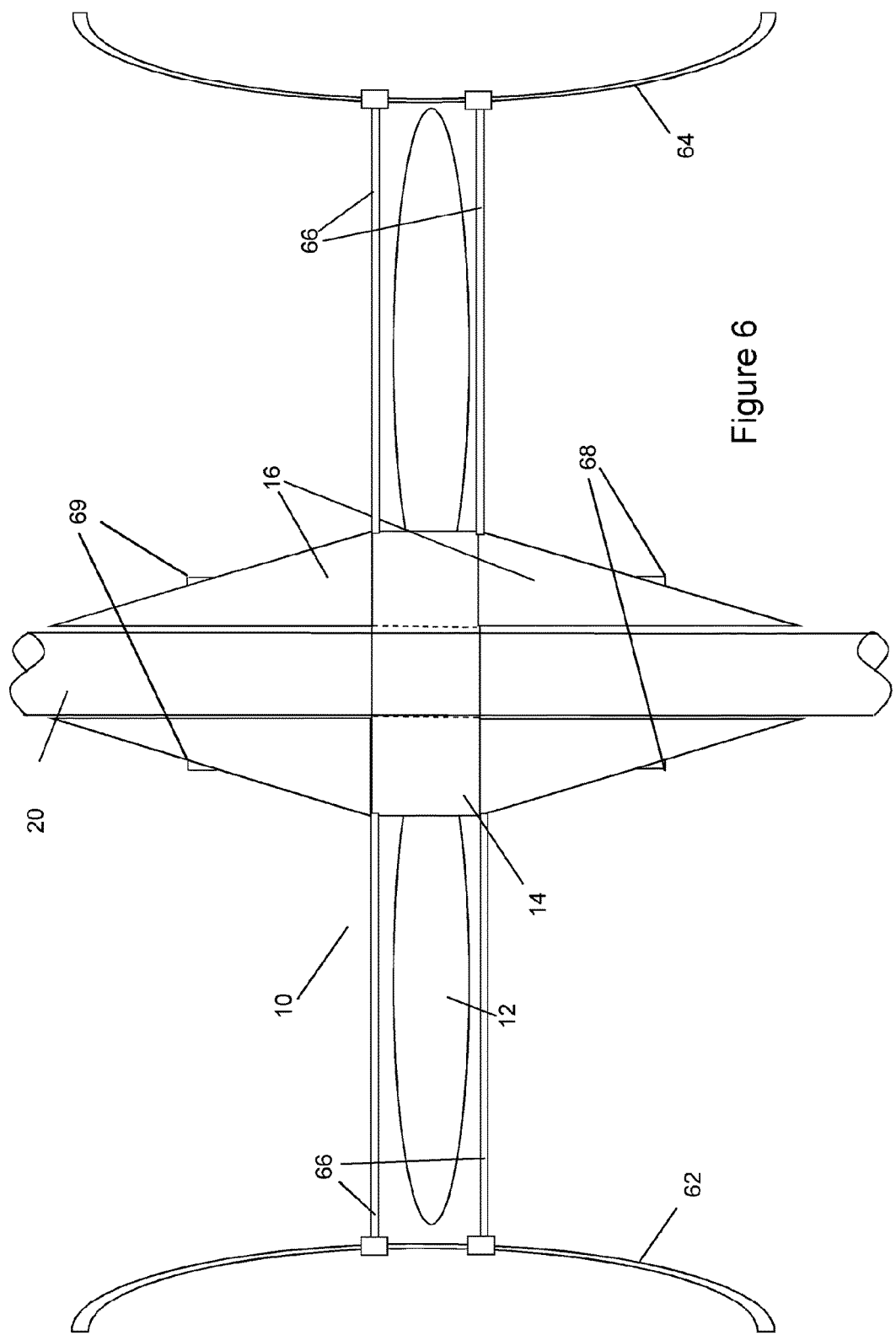

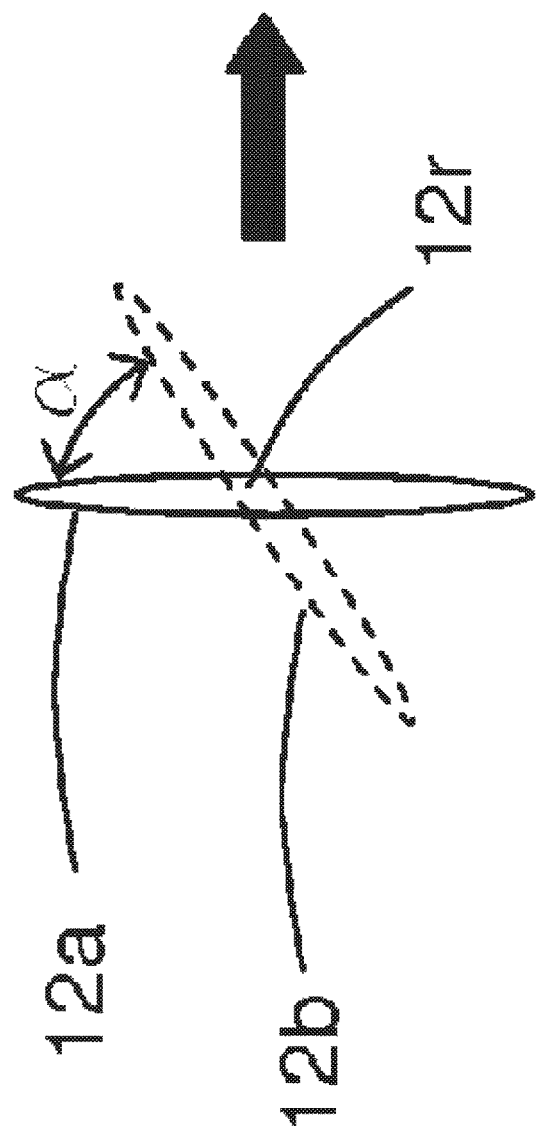

WATER TURBINE WITH VARIABLE BUOYANCY

CROSS-REFERENCE TO RELATED APPLICATIONS

This application is a U.S. National Stage of International Application No. PCT/GB2014/051966, filed Jun.27, 2014, which claims the benefit of United Kingdom Patent Application No. 1311461.6, filed Jun.27, 2013, both of which are incorporated herein by reference in their entireties.

TECHNICAL FIELD

The present invention relates to a floatable turbine for the generation of electricity, and to a generating system using such a turbine.

BACKGROUND TO THE INVENTION

Seawater is 832 times denser than air, which means that a 5 knot current has more kinetic energy than a 350 km/h wind. Schemes are known to have underwater turbines situated in coastal areas with high tidal currents, such as the scheme run by Marine Current Turbines, of Bristol UK, at Strangford Lough in Northern Ireland. Here turbine blades 15 to 20 meters across are caused to rotate at 10-20 revolutions per minute by the action of tidal currents. One prototype is operational in Strangford Narrows, Northern Ireland, and uses twin 16 m diameter rotors to develop a rated power of 1.2 MW at a current velocity of 2.4 m/s. This leads to an effective efficiency in turning the kinetic energy of the water into electricity of 43% for the whole turbine system.

However, the deployment of such projects is dependent upon local coastal conditions generating suitable tidal currents, and is not suitable, for example in deepwater, off shore. There is therefore a need for a deep water solution to generate electricity using water driven turbines, and which:
1) can be deployed in waters without significant natural currents; and
2) has a high power output m2 of utilized sea bed.

Buoyancy generators are known in the art from WO2009/026610, GB2456798, US2006/017292, GB507093 and US2005188691.

SUMMARY OF THE INVENTION

An aspect of the present invention addresses the above problem by the provision of a floatable turbine to store and generate electricity, which is movable on a substantially vertically oriented guide so that the turbine may move downwards along the guide under gravitational force. The turbine equipment is of negative buoyancy to facilitate it sinking, but is further provided with adjustable buoyancy means to allow the turbine arrangement to be imparted with a positive buoyancy when required. When imparted with positive buoyancy the turbine equipment floats back up the vertically oriented guide under the buoyancy force. When moving down the guide under gravity, and back up the guide under buoyancy an effective artificial current is generated by the relative movement of water through the turbine blades, turning the blades which in turn cause a generator to produce electricity.

In order to provide the controllable buoyancy in some embodiments a compressor is provided that supplies compressed air at a suitable pressure to docking ports provided at the lower end of the guide and to which the turbine equipment docks when it reaches the end of the guide. The turbine equipment is provided with ballast tanks or similar buoyancy adjustment means such as flotation bags, into which compressed air or other gas can be pumped, so as to impart positive overall buoyancy to the turbine equipment.

The energy required to run the compressor is important, as provided the energy required by the compressor to compress sufficient air or gas to impart positive buoyancy is less than the sum of the energy generated by the turbine equipment on both its downward and subsequent upward paths, then the arrangement will be energy positive in generation terms.

In one preferred deployment scenario multiple such turbine and guide units are deployed as a "farm", with a single compressor unit supplying compressed air to the units. The up and down "duty cycles" of the turbines are staggered in time, such that only one or a subset of the turbines are being supplied with compressed air at any one time, and the rest or a majority of the turbines are engaged in their respective duty cycles, and hence are generating electricity.

In one typical deployment it is envisaged that the turbine blades may be in the region of 10 to 20 meters diameter, and the weight of the turbine and associated generation equipment and ballast tanks to be of the order of 8 to 15 tonnes. The length of the guide means is envisaged to be in the range of 100's to 1000's of meters. For example, a 10 tonne turbine on a guide means of 1000 m length has potential energy of 98 MJ. If it was to sink at a rate of 2.4 m/s then a potential maximum power of 235.5 kW would be available, assuming 100% efficiency. Whilst such efficiency is impossible, even allowing for a conservative efficiency of only 30%, then a power output in excess of 70 kW is produced. With the same efficiency as the prior art turbine (43%), then power in excess of 100 kw is produced, for 416 seconds (the time it takes the turbine to fall the 1000 meters along the guide.

At 1000 m the water pressure is approximately 100 atm (~1470 psi), however high pressure compressors such as those available from Hydro-Pac, Inc, are capable of producing a discharge pressure of 1500 psi (10 MPa), supplying for example 111 normal cubic meters per hours at such a pressure from 45 kW motor power (see specifically model number C1.56-70/140LX, by way of example). In order to raise a 10 tonne mass from the seabed then in excess of 10 $m^3$ of water would need to be displaced to produce a positive buoyancy, but with such compressors this volume of air can be supplied at an appropriate pressure in less than the amount of time it takes for the turbine to sink along the guide. Specifically, at a rate of 111 normal cubic meters per hour then in 416 seconds a total of 12.82 cubic meters of air can be supplied at a greater pressure than surrounding water pressure, which is more than sufficient to raise the turbine. As the turbine will also generate power on the way up, the system is energy positive, as whilst some of the power generated is required to run the compressor, this is significantly less than the amount of power generated by the turbine as it sinks and ascends.

In view of the above, from one aspect the present invention provides a floatable turbine comprising a rotatable set of turbine blades communicatively coupled to an electrical generation system arranged to generate electricity as the turbine blades rotate, the floatable turbine being further provided with a buoyancy control system arranged to controllably impart positive buoyancy to the floatable turbine, the turbine being further provided with a guide follower arranged to follow a guide along which said turbine may move, the floatable turbine being for submersion in water, the turbine blades being arranged to rotate as the turbine moves through the water.

Another aspect of the invention provides an air tower suspended within water. The tower comprises a pipe extending from above a water surface to a depth below the water surface. The pipe is open to and filled with relatively warm and humid air from above the water surface. As the depth of the water increases, the temperature of the water decreases. Oceans, for example, have distinct layers with the upper most layer called the surface layer. This layer may extend to around 250 meters below the surface having a temperature of around 22 degrees Celsius. Below this, there is a thermocline, which is a temperature boundary layer. The thermocline may range from 250 to 1000 meters below sea level with the water temperature declining across the thermocline from around 22 to around 5 degrees Celsius.

The suspended air tower is cooled by the ambient water temperature and may extend across the thermocline of the sea water. The cooling effect on the tower by the surrounding water is more prominent as the depth of the water increases and the water temperature decreases. The cooled tower acts to cool the air contained within and the warm and humid air is cooled below its saturation limit. Below the saturation limit, water condenses out of the air on both the insides of the tower and within the tower falling as rain.

The water will collect within the tower forming a reservoir of non-saline water. This water may be pumped out from within the tower and used for either human or animal consumption, or irrigation, for example. A non-saline water generation system is hereby provided that requires only a very small amount of energy to pump the non-saline water out from within the air tower. In comparison, current water purification systems, such as those employing reverse osmosis, require large amounts of energy to provide non-saline water.

The cooling of the air within the water tower may be facilitated using either active or passive heat exchange systems between the water surrounding the tower, the tower wall itself and/or the air within the tower.

The cool air from which the water has condensed may be pumped out of the tower and used for cooling purposes. A pump may be located either inside or outside of the tower to pump the cold and non-humid air to a residential or commercial establishment where it is used for climate control thereby reducing the need for air conditioning, for example. Climate control using the pumped cold air saves energy which would otherwise be used to refrigerate warm air as part of an air conditioning unit. Further, as the cool air is pumped out of the air tower, warm and humid air is drawn into the tower from the water surface maintaining the condensation process within the tower.

The air tower may extend to the bed of the water body in which it is formed, or extend only partially to the bed to which it may be secured by either a structure or a tether.

Further features and aspects of the invention will be apparent from the appended claims.

BRIEF DESCRIPTION OF THE DRAWINGS

Further features and advantages of the present invention will be further apparent from the following description of embodiments thereof, presented by way of example only, and by reference to the accompanying drawings, wherein like reference numerals refer to like parts, and wherein:

FIG. 2 is schematic plan view diagram of the turbine equipment of FIG. 1;

FIG. 3 is a diagram showing a typical deployment scenario in an embodiment of the invention;

FIG. 6 is a schematic side view of a turbine equipment according to another embodiment of the invention;

FIG. 11 is a schematic side view of a rotor blade.

DESCRIPTION OF THE EMBODIMENTS

Figure 1:
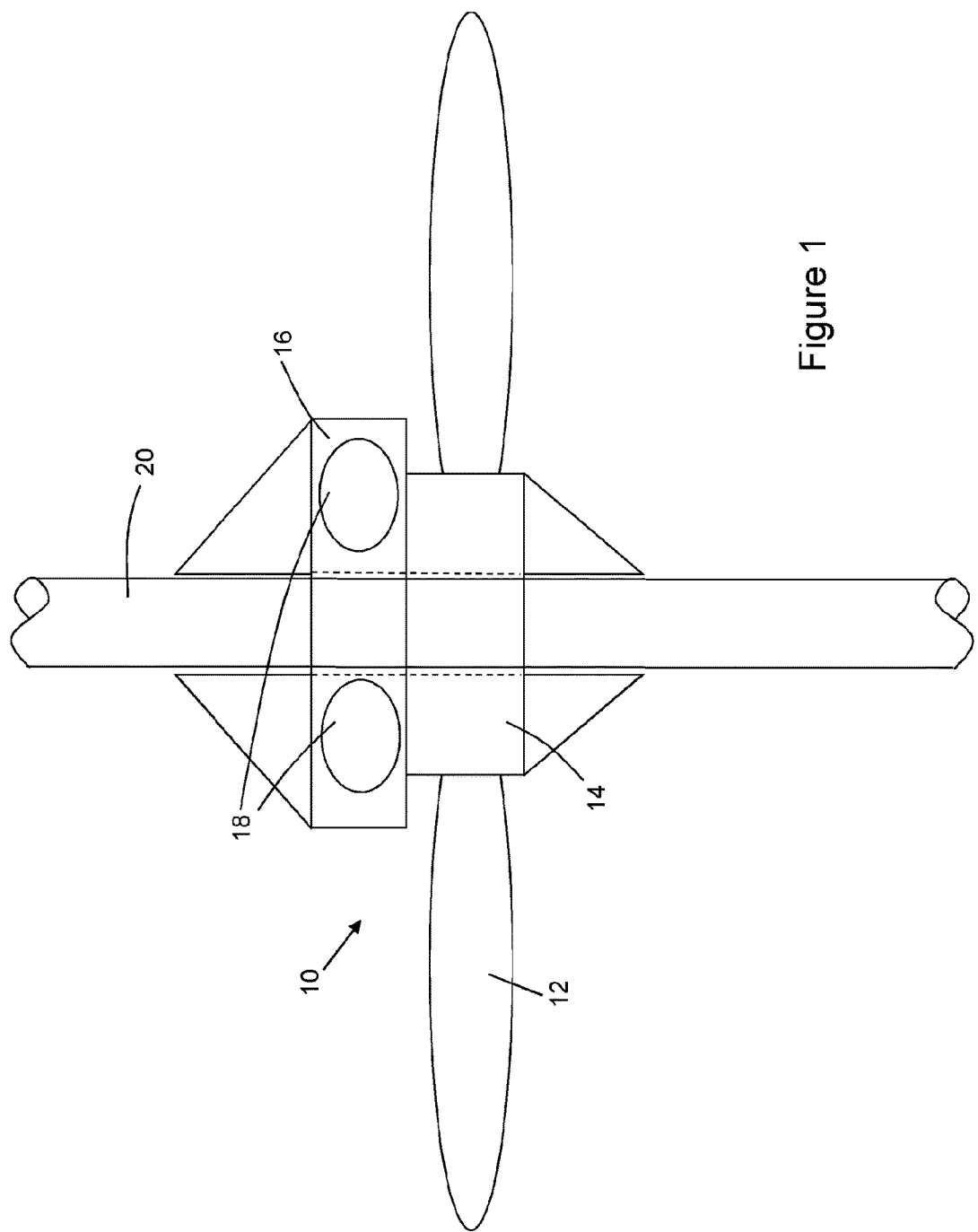
FIG. 1 is a schematic side view diagram of a turbine equipment of an embodiment of the invention.

FIGS. 1 and 2 illustrate an example floatable turbine 10 forming an embodiment of the invention. The floatable turbine 10 is provided with turbine blades 12 that are connected to generator housing 14, containing electrical generation equipment. For example, generator housing 14 may contain suitable gearing and a generator or alternator coupled to the gearing and arranged to generate electrical power as the turbine blades turn. The arrangement of the turbine blades is such that they rotate about the generator housing 14 as the floatable turbine 10 moves up and down through the water The floatable turbine is arranged to move up and down on a guide 20, which in this embodiment passes through the central axis of the turbine about which the blades rotate. In other embodiments the guide may take a different form, and need not be on the central axis. For example, in one alternative embodiment the guide may take the form of a water filled perforated pipe or pipe like body through which the floatable turbine moves.

The floatable turbine 10 is provided with a ballast box 16, which in this embodiment contains ballast tanks 18 arranged to receive compressed air or other gas when it is desired to impart a positive buoyancy to floatable turbine 10. In one embodiment the ballast tanks 18 are expandable lifting bags, such as those that may be used in salvage operations. Preferably, however, the bags are provided with a valve such that once they have lifted the floatable turbine to a shallow depth the air is released therefrom, such that the turbine can then sink back to the end of the guide under gravity.

In another embodiment, the ballast box 16 is a ring torus shaped ballast tank 18. The ring torus ballast tank 18 surrounds the guide 20 and the guide passes through the centre of the ring.

The turbine is weighted to be slightly negatively buoyant with respect to surface sea water when the ballast tank 18 is filled by sea water. This ensures that a minimum amount of air can make the turbine buoyant when its buoyancy is increased at the docking station 36, thereby maximising the efficiency of the turbine.

In one embodiment, a floatable turbine 10 is used as an energy storage unit. Electrical energy is stored as potential energy in either a positively or negatively buoyant floatable turbine mechanically held underwater. While the turbine is held, it has neither an energy input nor an energy output.

However, once the turbine is released from a held position, its buoyancy creates either an upward or downward force for generating electrical energy.

An upward force is created when the floatable turbine 10 is positively buoyant. The floatable turbine may be held at its lowest point (i.e. a docking station located on the sea bed) and its ballast box filled with air making it positively buoyant. When electrical energy is required, the holding force applied by suitable clamps, an electromagnet or similar is released and the upward force created by the positive buoyancy generates an upward movement of the turbine through the surrounding water and a rotational force to the turbine is provided by the movement of the blades 12 passing through the surrounding water. The turbine provides an electrical energy output until it reaches an upper limit of movement. At this upper limit, the floatable turbine remains positively buoyant in the water, thus there is no movement of the floatable turbine within the water and no electrical power generation.

Gravitational potential energy is stored by the floatable turbine 10 at this position, which can be liberated to generate electrical energy by purging the ballast box of air and filling it with water to make the floatable turbine negatively buoyant. The negatively buoyant floatable turbine will sink through the surrounding water and the blades 12 will provide a rotational movement for the turbine to convert into electrical energy. The floatable turbine 10 will continue to descend through the surrounding water producing electricity until it reaches a lower range of movement at which point electrical generation subsides.

The guide 20 is preferably shaped such that it is not possible for the turbine as a whole to rotate about the guide. The turbine 10 is provided with a correspondingly shaped hole therethrough, through which the guide is received. As shown in FIG. 2, an oval shaped guide may be used, although other shapes, such as rectangular, square, or any shape except circular, are preferable. If a circular cross section guide is used, then a mechanism such as guides or grooves or the like may be provided in the guide into which lugs on the turbine fit, such that the turbine equipment as a whole does not simply spin around the guide as it ascends and descends. For example, a circular pipe with T shaped runners or guides projecting therefrom may be used.

In this embodiment, guide 20 extends from the surface of the water to the docking station which is located on the sea bed. The implementation of such a guide means that no cables are required to secure the turbine to either the docking station, or an optional platform located on the water's surface. The guide also means that even in the presence of open water currents, the turbine will ascend and descend along the same path, reducing safety concerns in the case of multiple turbines operating in the same body of water.

Optionally, a pump (not shown) may be provided either as part of the turbine 10 or at a dock at the lower range of movement of the turbine 10 to expel water from ballast tank 18. As water is pumped out of the ballast tank 18, a partial vacuum is created within the ballast tank by the expansion of air trapped within the ballast tank. The partial vacuum within the ballast tank 18 increases the buoyancy of the ballast tank making the turbine 10 buoyant.

FIG. 3 shows a typical deployment scenario, where a "farm" comprising several sets of floatable turbines 10A-10E are provided, each with their own respective guides 20, shown in this case extending from the seabed to the surface. At the bottom end of each guide 20 is a docking port 36, provided with docking valves (not shown) communicatively coupled to a gas compressor 32, via respective connection hoses 38. Compressor 32 is provided with an air intake 34 extending to the surface of the sea. Compressor 32 may be an LX series compressor available from Hydro-Pac, Inc., and particularly the compressor referred to previously.

In the deployment of FIG. 3 five floatable turbines 10A to 10E are shown, each in a different stage of its descent and ascent duty cycle. For example, turbine 10 A is approximately half way through the downward leg of its duty cycle, and hence will be producing electricity as it moves through the water under the effect of gravity. Similarly, turbine 10B is also on the descent stage of its duty cycle, but is higher in the water than turbine A, and hence is earlier in the descent stage than turbine 10A. In this respect, the duty cycle of turbine 10B is staggered so as to lag that of turbine 10B.

Turbines 10C and 10D are both on the ascent stages of their respective duty cycles, with turbine 10D ahead in time of turbine 10C. Note that in this example both turbines 10 C and 10D have the lifting bags 18 provided in ballast tanks 16 inflated, in order that they have positive buoyancy. In other embodiments ballast tanks with pressure regulating valves may be used. In yet other embodiments a combination of ballast tanks and lifting bags may be used. Depending on the force provided by the lifting bags and/or ballast tanks, the turbines 10C and 10D will be moving through the water at a certain speed, and hence producing electricity as their respective turbine blades rotate with the movement. In one embodiment the lifting rate of the turbines is substantially matched with the sinking rate, such that easy management of the respective duty cycles of the different turbines is obtained. However, this is not essential, and it is possible for the ascent stage to be of different, perhaps longer, duration than the descent stage.

Turbine 10E has finished its descent stage and is docked with its respective docking port 36. As noted previously, docking port 36 is provided with docking valves or quick coupler valves which connect with valve inlets provided on the turbine body in order to provide compressed gas from the compressor to the ballast tank 16 and/or lifting bags 18. As shown, the lifting bags 18 of turbine 10E are only partially filled, being in the process of being filled by the compressor. Once filled to a sufficient amount the docking mechanism releases, and the turbine is then free to float towards the surface, generating electricity as it proceeds upwards.

Wake created by a rotational movement of a first floatable turbine's blades within the water creates eddy currents in the surrounding water. The eddy currents spread out from the first floatable turbine's blades and the blades of a second turbine passing through the same surrounding water may pass through the eddy currents. The turbine blades will be most efficient when passing through laminar water, thus the eddy currents will decrease the efficiency of the second turbine.

The relative spacing of a plurality of floatable turbines forming a farm arrangement is planned to minimise inter-turbine turbulence caused by the wake of any floatable turbine adversely affecting the efficiency of another floatable turbine.

Additionally, inter-turbine turbulence may be reduced by only operating a turbine while adjacent turbines are stationary, or vice versa.

Figure 5:
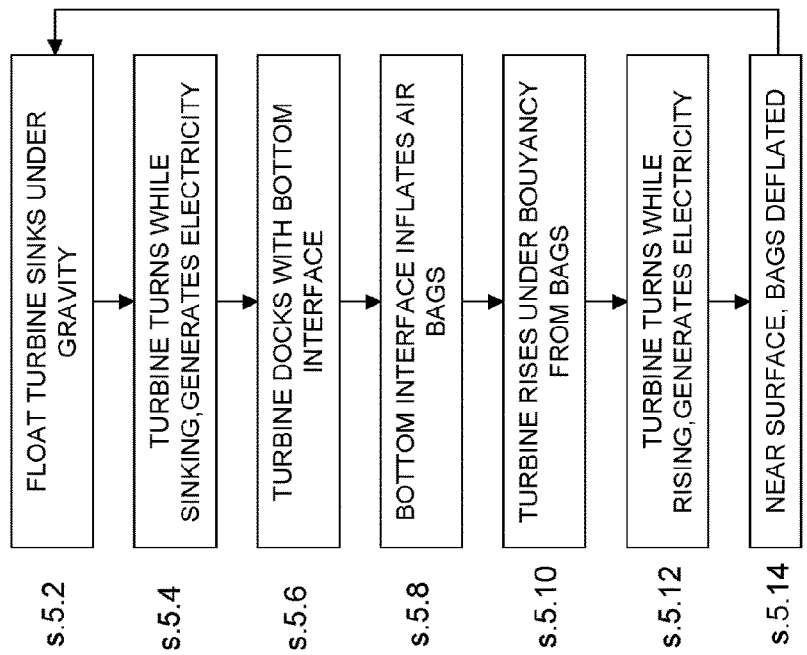
FIG. 5 is a flow diagram illustrating the method of operation of an embodiment of the invention.

The duty cycle of any one turbine is shown by the flow diagram of FIG. 5. Firstly, assume a turbine is at the top of an ascent stage. Here a valve is opened to release all gas from the ballast tank and/or lifting bags, and the turbine then sinks under gravity (s.5.2). Whilst sinking the turbine blades rotate, and electricity is generated (s.5.4). Once at the bottom of the ascent stage the turbine docks with the bottom docking interface (s.5.6), and the bottom interface then begins to inflate the lifting bags and/or fill the ballast tanks with compressed gas (s.5.8). Once filled by the desired amount, the docking interface releases the turbine, and the turbine begins to rise under the positive buoyancy imparted from the lifting bags and/or ballast tanks (s.5.10). Whilst rising the turbines spin (typically in the opposite direction from descending, if the pitch is fixed), and electricity is generated. The ascent stage continues until the turbine approaches the surface, in which case the lifting gas is released from the lifting bags/ballast tanks (s.5.14), and the cycle then starts again.

As noted, the duty cycles of the turbines in the farm should preferably be staggered, such that only one turbine is docked and receiving compressed air from the compressor at any one time, and other turbines are in ascent or descent phases such that they are able to supply power to run the compressor. The exact phasing of the duty cycles will depend on primarily the length of the turbine guides, which determines the number of turbines that can be run from a single, 100% utilized, air compressor. In an alternative embodiment, the phasing can also be monitored by various sensors fitted on the turbine and further controlled by a CPU/PLC.

The floatable turbine array of FIG. 3 may be used to store energy in a manner that allows a controlled release. One or more floatable turbines 10A-10E are held by a docking mechanism whist filled with compressed gas by a compressor driven by electrical energy. Those turbines store potential energy whilst held, but transduce the stored potential energy into electrical energy when they are released by the docking mechanism.

Figure 4:
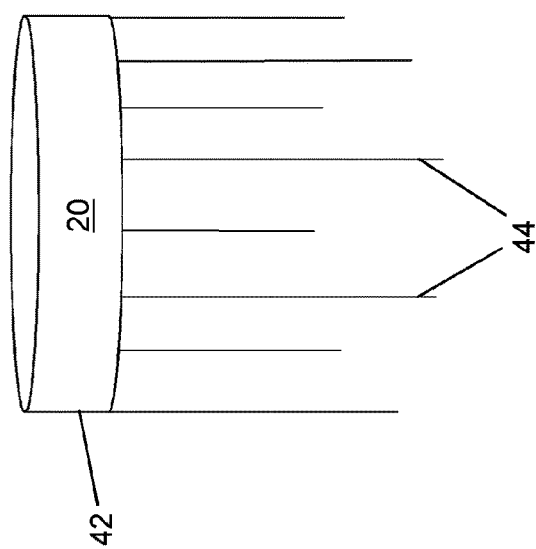
FIG. 4 is a diagram of a variation of the guide used in an embodiment of the invention.

Regarding how generated power is supplied to the surface, FIG. 4 illustrates the guide 20 in more detail. Here, it will be seen that a guide 20 may comprise a buoyant upper ring 42, which floats on the surface. The body of the guide is then formed from a number of individual wires 42 which hang from the buoyant upper ring 42, and along which the turbine moves. The turbine is provided with brush contacts which contact at least one of the wires in order to supply the generated electrical current thereto, with the wire then carrying the current to the bottom, or alternatively to the surface from where it can be then tapped off into an on shore electrical grid distribution system.

Various modifications may be made to the above described embodiment to provide further embodiments. For example, the turbines may have fixed pitch blades, or alternatively may be provided with variable pitch blades. The advantage of variable pitch blades is that the pitch may be controlled to vary the drag on the turbine blades, and hence the rate of descent and ascent, and hence power output. In addition, at the very least the pitch of the blades may be reversed between ascent and descent phases, and vice versa, such that the turbine spins the same way on both phases of the cycle. This removes the need for reversing gearing.

In addition, each floatable turbine may be provided with more than one set of blades, for example may be provided with contra-rotating sets of blades. Such contra-rotating propeller type systems have been shown to be more efficient than a single set of blades.

Figure 9:
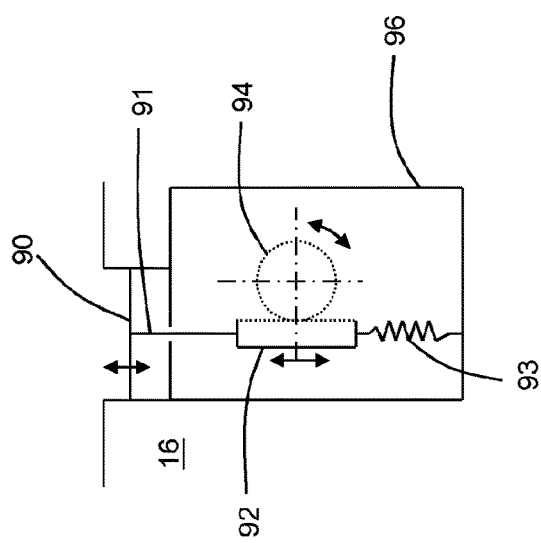
FIG. 9 is a schematic side view of a rotor pitch adjustment mechanism.

FIG. 9 shows a blade pitch control mechanism for use with a turbine blade. A gearing chamber 96 is formed in a ballast tank 16. A front face 90 is exposed to either an upper and/or lower side of the ballast tank 16 so that a movement of the ballast tank 16 upwards and/or downwards through the surrounding water alters the pressure on the front face 90. The front face 90 is movable with respect to the ballast tank 16 and is coupled to a piston 91, which is movable with the front face 90. The piston 91 is connected by a linear gear 92 to a biasing means, e.g. a mechanical spring. The biasing means provides a force to resist movement caused by pressure on the front face 90. A cog 94 is coupled to the linear gear 92 and rotates with movement of the linear gear (and piston). In one embodiment, a turbine blade (not shown) is directly coupled to the cog 94 about its rotational axis. In another embodiment, the blade is coupled to the cog by intermediate components, which may include gears. In both above embodiments, rotation of the cog 94 by movement of the piston 91 alters the pitch of the turbine blade.

A single blade pitch control mechanism may control the pitch of a single turbine blade or, alternatively the single mechanism may control the pitch of a plurality of blades by mechanical linkages.

In yet another embodiment, an electronic control unit monitors the rate of ascent and/or descent and controls the turbine blade angle using the torsion created bt the blade pitch control mechanism. A floatable turbine of the present disclosure can include a speed detecting means for detecting the speed at which the rotatable set of turbine blades of the floatable turbine moves through the water and a turbine blade adjustment means to adjust a pitch angle of one or more of the rotatable set of turbine blades. The pitch angle of the rotatable set of turbine blades is dependent on the speed detected by the speed detecting means.

FIG. 11 shows a rotatable turbine blade 12*a* from a perspective along the axis of rotation 12*r* of the blade. Three parallel hollow arrows represent the movement of water relative to the blade and a single block shaded arrow represents the desired movement of the blade for energy generation purposes.

The blade 12*a* is shown in a first orientation drawn using a solid line. The blade 12*b* is shown in a second orientation drawn using a broken line, wherein the blade has rotated by angle α about the axis of rotation 12*r* to reach the second orientation from the first orientation.

The blade provides i. minimum resistance to ascent and/or descent when the turbine blade 12*a* is positioned with angle α equal to 0 degrees (shown in FIG. 11 with the turbine blade drawn using a solid line); and ii. maximum resistance to ascent and/or descent when the turbine blade is positioned with angle α equal to 90 degrees (not shown in FIG. 11).

The most efficient blade pitch for generating electricity using the invention relates to the characteristics of the alternator used in the turbine and the number, size, shape and rake of the turbine blades. The pitch angle (α) may be calculated from the pitch (pitch) and radius (r) of the blades using the formula:

$$\tan \alpha = \text{pitch}/2\pi r \qquad \text{[Formula 1]}.$$

In one embodiment, the average angle along the length of the turbine blade is between 45 and 60 degrees. In another embodiment, the average angle along the length of the turbine blade is between 55 and 60 degrees.

In FIG. 9, the blade pitch control mechanism is shown partially contained within the gearing chamber 96 within the ballast tank 16. Alternatively, the blade pitch control mechanism is arranged within other structures of the turbine.

In another modification, the compressor need not be located on the sea floor, but could instead be floating on the surface or onshore next to a compressed air tank farm, with supply hoses then extending to the interface docks at the bottom of the guides.

In a further modification, instead of providing the compressor at the turbine farm, a compressed gas supply such as a compressed gas tank may be provided, either on the sea bed, or on the surface. This removes the need to power a compressor locally. However, there will still be a need to power a compressor somewhere to compress gas to put in the tank, but provided the energy required to run such a compressor and then transport the tank to the turbine farm is less than that generated in total by the turbines, then the whole arrangement will still be energy positive.

In a further modification, the compressor may be powered by renewable energy means, such as those powered by wind or sun energy. In this way when an energy generation network is running at a surplus, the energy may be stored in compressed air, and subsequently used to be imparted into the floatable turbine to alter its buoyancy. This means by implementing the floating turbine of the present invention in a network reliant on renewable sources of energy, the network's output can readily be smoothed and adjusted depending on the consumers' requirements.

In a further modification, instead of providing a ballast tank or lifting bags, some other part of the turbine may instead be filled with buoyant fluid to commence an ascent phase. For example, the turbine blades may be hollow, and filled with water on a descent phase, which is then pumped out and replaced with a buoyant fluid before an ascent stage.

In yet another modification, the turbine may be self guiding, for example by being provided with control guidance electronics, and small steering thrusters, such that it is then possible to do away with the guide 20. In such a case, the turbine may freely ascend and descend, but control its lateral position via the steering thrusters (for example small propellers powered by electric motors mounted on the body of the turbine), so as to enable the turbine to dock with the bottom interface.

FIG. 6 illustrates a further embodiment of the turbine equipment 10. Here, the ballast tanks 16 are hydro-dynamically shaped to reduce drag as the turbine passes through the water, in either direction. In addition, it will be seen that ballast tanks 16 are provided both above and below the electrical generation system 14.

In addition, the turbine blades are provided with a shroud, comprising left and right shields 62 and 64, each attached to the central turbine body by struts 66. The shields 62 and 64 are curved, so as to act as a venturi to guide water towards the turbine blades at higher speed than the speed of movement of the turbine along the guide. This should increase the water flow rate through the turbine, but without increasing the speed of the turbine along the guide, and may provide for an increase in power obtained.

The shields 62 and 64 may controllably slide up and down in shield holders attached to proximal end of struts 66 to the shields, such that the effective input throat width of the venturi formed by the shields may be varied so as to be increased or decreased.

The shields 62 and 64 may also be made out of a rigid material which can flex. This would allow a self expanding venturi to be created in the direction of travel of the turbine while keeping the other end of the shield compressed and narrower. This can achieve the required venturi advantage with no power consumption. This mechanism may also be electro-mechanically, electrically, or electro-hydraulically controlled by the ECU to vary the descent/ascending speed of the turbine.

Figure 7A:
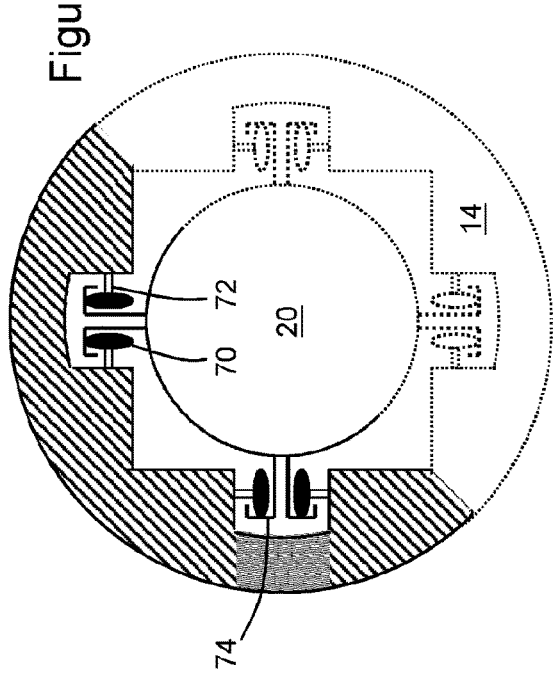
FIG. 7a is a cross-sectional view of a first guide rail system.

FIG. 7a shows a spherical guide 20 surrounded by the generator housing 14. Four pairs of wheels 70 are rotatably attached to an inner surface of the generator housing 14 by four pairs of axels 72. The pairs of wheels 70 are equally spaced about the inner surface of the generator housing 14. Each wheel 70 runs in its own U-shaped guide rail 74 that is attached to an outer wall of the spherical guide 20 by a first arm of the U-shaped guide rail 74 which extends further than a second arm. Alternatively, the guide 20 may be non-spherical, possibly elliptical, and/or there may be more or fewer pairs of wheels.

Figure 7B:
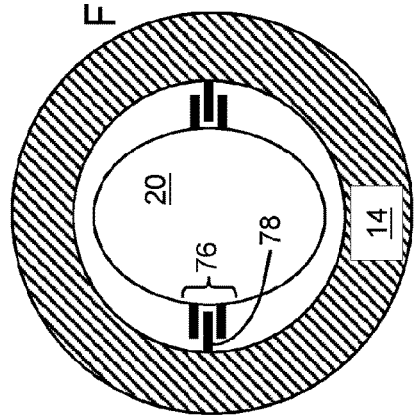
FIG. 7b is a cross-sectional view of a second guide rail system.

FIG. 7b shows an elliptical guide system 20 surrounded by a spherical generator housing 14. The guide system comprises two pairs of guide rails 76 extending inwardly along the length of the guide system with the pairs running along opposite sides. A single guide rail 78 is mounted the inside of two sides of the generator housing 14 and extend outwardly. Each single guide rail 78 extends between a single pair of guide rails 76 and is slidable along the length of the pair of guide rails 76. Alternatively, the guide system 76, 78 may include further sets of guide rails and/or the single guide rail 78 may be replaced by a double guide rail 76 and vice versa.

Figure 8:
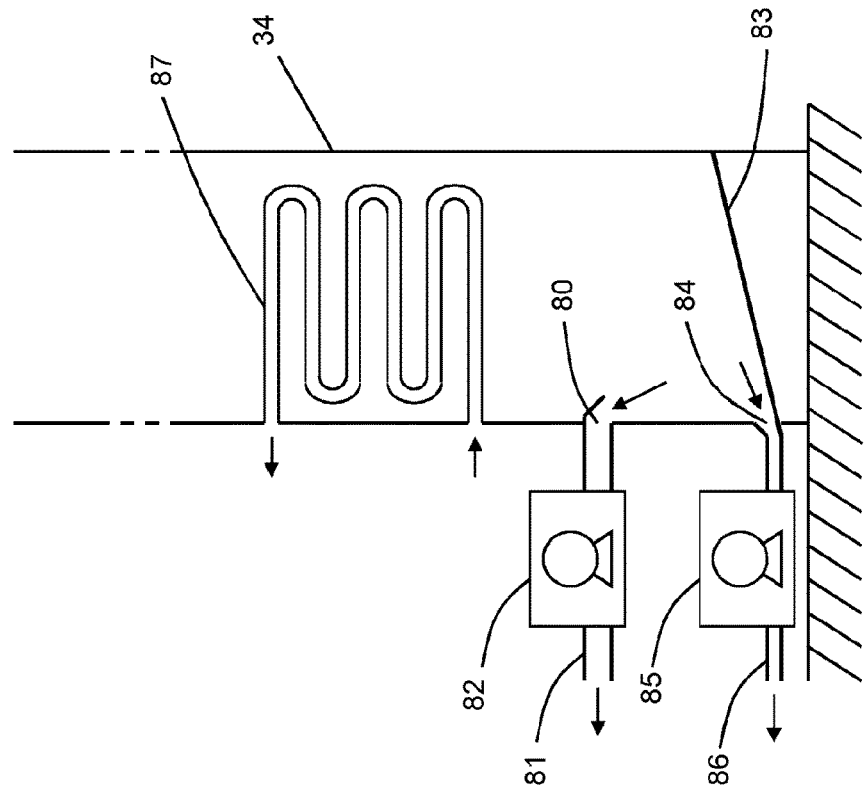
FIG. 8 is a schematic view of a lower part of an air tower.

FIG. 8 shows a section of an air intake, which may be the air intake 34 of FIG. 3 or an embodiment separate to that shown in FIG. 3. The section of the air intake 34 shown in FIG. 8 is a lower extremity; however, the features shown in FIG. 8 may be provided higher up the air intake 34 and not in the illustrated relative positions.

The air filled air intake 34 reaches to the surface where the air is both warm and humid. Near the surface, the water is also relatively warm; however, the water temperature decreases as the water depth increases. The body of the air intake 34 is cooled by the surrounding water to a greater extent as the depth of the water increases. The warm and humid air from the surface is cooled by the body of the air intake 34 and water vapour condenses out of the air within the air intake onto the cooler surface within the air intake.

The coolest air is that within the air intake 34 at the bottom where the sea temperature is lowest. Below the thermocline the temperature of the seawater falls towards 0° C. Since this system is designed to take advantage of significant ocean depths, this temperature differential means that the present system is effective in the cooling of the air in the air column. In this lower region, there is an air extraction port 80 within the wall of the air intake 34. The air extraction port 80 draws the cold air from the air intake 34 through a thermally insulated cold air pipe 81. The cold air pipe 81 transports the cold air to either residential or commercial structures where it is used for district cooling purposes. The cold air is moved along the cold air pipe using an air pump 82. In FIG. 8, the air pump is shown at a position along the cold air pipe 81 close to the air intake 34; however, the cold air pump 82 may be located within the air intake 34, or further along the cold air pipe 81 and even onshore.

Air intake 34 is shown in FIG. 3 to be separate from the floatable turbines present in the system. In one embodiment, (not shown in FIG. 3) the air intake may be housed within the guidance means 20. Air intake 30 forms an air tower extending from the surface of the water, where surface temperature air is drawn into the tower. The air tower has a track which cooperates with the guidance means that is installed on the floatable turbine.

The use of sea cooled air in residential or commercial structures removes or reduces the need for air conditioning, which is an energy intensive process.

The water that condenses from the humid air drawn from the surface moves under gravity to the bottom of the air intake where it is collected and extracted via an water extraction port 84. The water is pumped along a water pipe 86 by a water pump 85. The water pump 85 is shown located close to the air intake 34; however, it may be located either within the air intake, or at a point further along the water pipe 86.

The condensed water is non-saline and can be used as potable water. The condensation and pumping process required much less energy than conventional water purification methods.

A heat exchange system 87 is provided within the air intake 34. The heat exchange system is shown as a radiator with cold saline water being drawn into the air intake via a lower radiator opening. The cold saline water is drawn through the air intake 34 cooling the air within the air intake 34. The cooling effect from the radiator will increase water condensation within the air intake 34. As the cold saline water is indirectly heated by the air within the air intake 34, its density decreases and the warm saline flows upwards within the radiator before exiting via an upper radiator opening. A pump (not shown) may be used to pump water through the heat exchange system 87 thereby increasing its cooling effect.

Advantageously, as water vapour condenses into liquid water, its volume decreases thereby lowering the air pressure within the air intake 34 which draws air down the air intake 34 form the surface. Hence saving the need for an air compressor to pump atmospheric air into the shaft.

In one embodiment, the gas compressor 32 of FIG. 3 is used as the air pump 82 of FIG. 8.

FIG. 6 shows a set of upper and lower pressure release valves 68, 69. As the turbine ascends, the air contained within the ballast boxes 16 will expand and its density reduce (increasing the buoyancy of the device thereby increasing the rate of ascent). The expanding air is selectively releasable from via either the upper or the lower pressure release valves.

The lower pressure release valves 68, when opened, release a jet of the expanding air from the turbine ballast tank and provide an upwards force accelerating the turbine to increase the rate of ascent. The upper pressure release valves 69 direct the expanding jet of air upwards to slow the rate of ascent of the turbine.

The number and positioning of both the upper and lower pressure release valves may be altered to adjust the hydrodynamic properties of the turbine. In some embodiments, the turbine comprises one or more upper pressure release valves 69 or one or more lower pressure release valve(s) 68.

The fluid released through pressure release valve(s) 68 may be a fluid other than air, for instance it could be water, or any other abundant gas.

Figure 10:
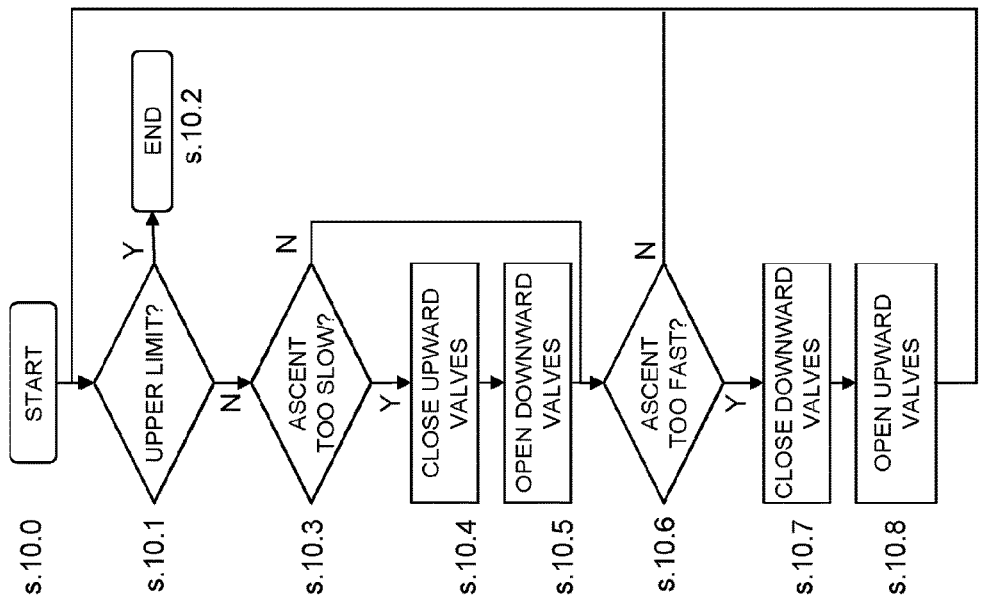
FIG. 10 is a flow chart for the control of pressure release valves.

FIG. 10 shows a method for controlling the pressure release valves of FIG. 6. The method controls the rate of ascent by selectively opening and closing the valves to increase or decrease the rate of turbine ascent.

At step s.10.0, the method starts and proceeds to step s.10.1. At step s.10.1, the method checks if the turbine has reached an upper limit of travel along its associated guide. If the upper limit has been reached, the method proceeds to step s.10.2 where it ends. If the upper limit has not been reached, the method proceeds to step s.10.3 where an instantaneous rate of turbine ascent is measured. If the rate of ascent is below a first predetermined rate, the upward valves are closed (step s.10.4) and the downward valves are opened (step s.10.5) and the method proceeds to step s.10.6. This will increase the rate of ascent. If the instantaneous measured rate of ascent is above or equal to the first predetermined rate, the method proceeds to step s.10.6 and the upper and lower valves are not altered. At s.10.6, if the rate of ascent is above a second predetermined rate (greater or equal to the first predetermined rate), the downward valves are closed (s.10.7) and the upward valves are opened (s.10.8) and the method returns to step s.10.1. This will decrease the rate of ascent. If the instantaneous measured rate of ascent is below or equal to the second predetermined rate, the method returns to step s.10.1.

The method of FIG. 10 can be adapted such that the measurement is of underwater depth of the turbine, rather than rate of ascent, since the pressure at a given depth is known. The control of the valves is therefore dependent on how far the turbine has travelled from the surface of the water. The altitude above a fixed point may also be used to control the valves, the fixed point being either the floor of the body of water, or the lower limit of movement of the floatable turbine, defined by the guide 20.

Further modifications either by virtue of addition, substitution or deletion may be made to the above described embodiments to provide further embodiments, any and all of which are intended to fall within the scope of the appended claims.

The invention claimed is:

1. A floatable turbine comprising:
   a rotatable set of turbine blades operable to rotate about a common axis and communicatively coupled to an electrical generation system arranged to generate electricity as the turbine blades rotate;
   a buoyancy control system arranged to controllably impart positive buoyancy to the floatable turbine;
   a guidance means for guiding the floatable turbine along the common axis as it moves; and
   one or more air jets, wherein air released from the one or more air jets will increase or decrease a rate of ascent of the turbine;
   wherein the floatable turbine is suitable for submersion in water, and the turbine blades being arranged to rotate as the floatable turbine moves through the water.

2. The turbine of claim 1, wherein the floatable turbine is hydrodynamically shaped.

3. The turbine of claim 1, wherein the buoyancy control system comprises one or more hydrodynamically shaped ballast tanks.

4. The turbine according to claim 3, wherein the one or more hydrodynamically shaped ballast tanks are a frustum of a cone with central column absent, wherein the guidance means is provided within the central column.

5. The turbine of claim 1, wherein the guidance means is coaxial with the common axis.

6. The turbine according to claim 5, wherein the guidance means comprises one or more sets of wheels mounted on the floatable turbine arranged to run along a fixed track.

7. The turbine according to claim 5, wherein the guidance means comprises a projection engageable with one or more projections extending from a fixed track.

8. The turbine according to claim 1, further comprising a control system to selectively operate one or more air jets dependent upon the rate of ascent of the turbine.

9. The turbine according to claim 1, further comprising a control system to selectively operate the one or more air jets dependent on the underwater depth of the floatable turbine.

10. A floatable turbine comprising:
    a rotatable set of turbine blades operable to rotate about a common axis and communicatively coupled to an electrical generation system arranged to generate electricity as the rotatable set of turbine blades rotate;
    a buoyancy control system arranged to controllably impart positive buoyancy to the floatable turbine;

a guidance means for guiding the floatable turbine along the common axis as it moves;

a turbine blade adjustment means to adjust a pitch angle of the rotatable set of turbine blades; and wherein the floatable turbine is suitable for submersion in water, and the rotatable set of turbine blades is arranged to rotate as the floatable turbine moves through the water.

11. A floatable turbine comprising:

a rotatable set of turbine blades communicatively coupled to an electrical generation system arranged to generate electricity as the rotatable set of turbine blades rotate;

a buoyancy control system arranged to controllably impart positive buoyancy to the floatable turbine; and a mechanical turbine blade adjustment means;

wherein the floatable turbine is suitable for submersion in water;

the turbine blades are arranged to rotate as the turbine moves through the water; and the mechanical turbine blade adjustment means comprises:

a turbine blade adjustment means to adjust a pitch angle of one or more of the turbine blades.

12. The turbine according to claim 11, wherein the turbine blade adjustment means comprises a mechanical device operable to convert a water pressure into pitch control of the one or more rotor blades.

13. The turbine according to claim 12, wherein the mechanical device comprises a plate coupled to a linear gear which is biased into position; and a rotatably mounted cog in engagement with the linear gear, wherein the cog is coupled to the rotatable set of turbine blades; and wherein the plate is movable with the application of a water pressure to the plate to cause a corresponding rotation of the rotatable set of turbine blades.

14. The turbine according to claim 11, wherein the turbine blade adjustment means comprises:

an electronic control unit arranged to detect a rate of ascent;

a processor coupled to the electronic control unit; and an actuator coupled to the rotatable set of turbine blades, wherein the actuator is controlled by the processor, and operable to adjust the pitch of the rotatable set of turbine blades.

15. The turbine according to claim 14, wherein the electronic control unit comprises an electronic pressure sensor, and the processor is arranged to interpret data collected by the electronic pressure sensor.

16. The turbine according to claim 14, wherein the processor is further arranged to calculate an optimum rate of ascent and to adjust the pitch of the rotatable set of turbine blades to provide the calculated optimum rate of ascent.

17. The floatable turbine according to claim 11, wherein the rotatable set of turbine blades is a first rotatable set of turbine blades; and the floatable turbine further comprises a second rotatable set of turbine blades operable to rotate about a common axis and communicatively coupled to the electrical generation system arranged to generate electricity as the second rotatable set of turbine blades rotate;

wherein the second rotatable set of turbine blades is arranged to rotate in an opposite direction to the first rotatable set of turbine blades.

18. The turbine according to claim 17, wherein the pitch angle of the first rotatable set of turbine blades and the pitch angle of the second rotatable set of turbine blades are both adjustable using the turbine blade adjustment means.

\* \* \* \* \*